United States Patent [19]

Moriya

[11] 4,241,630
[45] Dec. 30, 1980

[54] VISING AND FEEDING APPARATUS FOR CUTTING MACHINES

[75] Inventor: Kikuo Moriya, Machida, Japan

[73] Assignee: Amada Company, Limited, Isehara, Japan

[21] Appl. No.: 27,264

[22] Filed: Apr. 5, 1979

[51] Int. Cl.³ .............................................. B23D 55/04
[52] U.S. Cl. ...................................... 83/409; 83/796; 83/461; 83/466
[58] Field of Search ................. 83/796, 798, 800, 801, 83/409, 461, 466

[56] References Cited

U.S. PATENT DOCUMENTS

| | | | |
|---|---|---|---|
| 2,594,548 | 4/1952 | Flick | 83/800 |
| 2,883,736 | 4/1954 | Crane | 83/409 |
| 2,898,669 | 8/1959 | Crane et al. | 83/800 |
| 3,862,583 | 1/1975 | Tsuchiya | 83/796 |

*Primary Examiner*—Donald R. Schran
*Attorney, Agent, or Firm*—Thompson, Birch, Gauthier & Samuels

[57] ABSTRACT

A cutting machine for subdividing material lengths comprises a roller table establishing a transport path along which the material is directed to a cutting zone. A cutting head assembly has a cutting blade for cutting material located at the cutting zone. A front vise assembly is fixed adjacent to the cutting zone with first and second jaws arranged in opposed mutually spaced relationship on opposite sides of the transport path. A first jaw operating mechanism is provided for adjusting the spacing of the first and second jaws between an open position permitting movement therebetween of the material and a closed position clamping the material therebetween. A rear vise assembly is mounted on a carriage underlying the roller table. The carriage is movable in opposite directions parallel to the transport path. The rear vise assembly has third and fourth jaws also arranged in opposed mutually spaced relationship on opposite sides of the transport path. A second jaw operating mechanism is carried on the carriage and operates to adjust the spacing of the third and fourth jaws between an open position permitting movement of the carriage relative to the material and a closed position clamping the material therebetween, thereby establishing a fixed relationship between the material and the carriage. A carriage operating mechanism moves the carriage in opposite direction along the transport path.

8 Claims, 10 Drawing Figures

FIG. 10 ated by the numeral 1 in FIGS. 1 and 2. However, as

VISING AND FEEDING APPARATUS FOR CUTTING MACHINES

BACKGROUND OF THE INVENTION

1. Field of the Invention

The present invention relates generally to cutting machines such as bandsaw machines, hacksawing machines and circular sawing machines and more particularly pertains to apparatus for holding and feeding workpieces or materials to be cut in such machines.

2. Description of the Prior Art

As is well known, in cutting machines such as horizontal bandsaw machines and hacksawing machines, workpieces or materials to be cut are held by a vise which has jaws to grip the materials therebetween when they are being cut. Also, automatic cutting machines for cutting generally long materials are provided with two vises and are so constructed that one of the vises which is often called front vise holds the materials being cut at the cutting zone where cutting is performed by a cutting tool and the other vise which is often called rear vise holds and feeds the materials into the cutting zone. More particularly, the rear vise grips and brings the materials into the front vise which has opened its jaws at the cutting zone and then it is returned to its original position after the front vise has gripped the materials.

In conventional cutting machines, the trouble has been that the materials to be cut are slid in and into contact with portions of cutting machines when they are fed into the cutting zone. Also, in conventional cutting machines, the rear vise for feeding the materials is moved in contact with the materials when it is returned to its original position after having fed the materials into the front vise at the cutting position. Such being the case, much friction will be produced between the materials to be cut and portions of the cutting machines when and after the materials are fed into the cutting zone in the conventional cutting machines. Furthermore, since materials to be cut often have a more or less rough surface, there has been a tendency for the materials strike and sometimes damage portions of the cutting machines. Thus, the conventional cutting machines have suffered from a serious disadvantage that the materials to be cut cannot be exactly accurately fed into the cutting zone. Also, both of the materials to be cut and portions of the cutting machines often will be damaged when the materials are fed into the cutting zone.

Another disadvantage with the conventional cutting machines has been the fact that it is necessary to manually adjust the stroke length of one of the jaws of a vise or vises according to the size of materials to be cut. Accordingly, it has been very troublesome to adjust the opening or stroke length between the jaws of the vise or vises each time when it is desired to cut materials of different sizes in the conventional cutting machines.

SUMMARY OF THE INVENTION

It is a general object of the present invention to provide a holding and feeding apparatus for cutting machines in which damaging impacts and friction between materials to be cut and portions of the cutting machines are either prevented or at least substantially minimized when and after the materials are fed into the cutting zone where cutting is performed.

It is another object of the present invention to provide a holding and feeding apparatus for cutting machines in which materials to be cut are prevented from frictionally contacting or colliding with portions of the cutting machines to the greatest extent possible when and after they are fed into the cutting zone.

It is a specific object of the present invention to provide a holding and feeding apparatus for cutting machines in which vising means are partially moved to keep out of contact with materials to be cut when and after the materials are fed into the cutting zone.

It is another specific object of the present invention to provide a holding and feeding apparatus for cutting machines which is provided with an increased number of rollers on which materials to be cut are fed into the cutting zone.

It is therefore another specific object of the present invention to provide vising means for a holding and feeding apparatus in cutting machines which have been improved in construction. It is therefore a further specific object of the present invention to provide an improved hydraulically actuated vising means for a holding and feeding apparatus for cutting machines.

Furthermore, it is a very important object of the present invention to provide a hydraulically operated vising means for cutting machines in which the stroke length of one of vising jaws can be automatically adjusted according to the sizes of materials to be cut.

Other and further objects and advantages of the present invention will be apparent from the following description and accompanying drawings which, by way of illustration, show a preferred embodiment of the present invention.

BRIEF DESCRIPTION OF THE PREFERRED EMBODIMENTS

Referring now to the accompanying drawings, the present invention will be described as embodied in a horizontal bandsaw machine which is generally designated by the numeral 1 in FIGS. 1 and 2. However, as noted above, it is understood that the present invention is applicable to any suitable type of cutting machines such as hacksawing machines and circular sawing machines.

The horizontal bandsaw machine 1 comprises a base 3 and a cutting head assembly 5 in which a flexible endless bandsaw blade 7 is trained around wheels (not shown). The cutting head assembly 5 is pivotally connected to the base 3 so that it may be raised by a well-known means and then lowered to enable the bandsaw blade 7 to cut into a material M to be cut which has been placed on the base.

Figure 1:
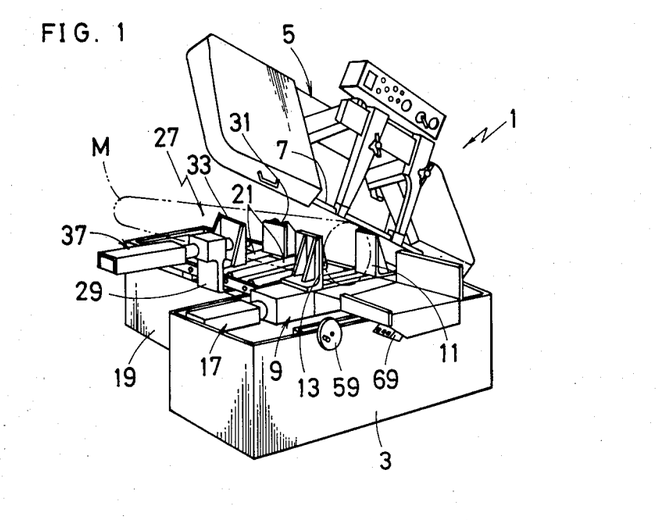
FIG. 1 is a perspective view of a horizontal bandsaw machine embodying the principles of the present invention.
Figure 2:
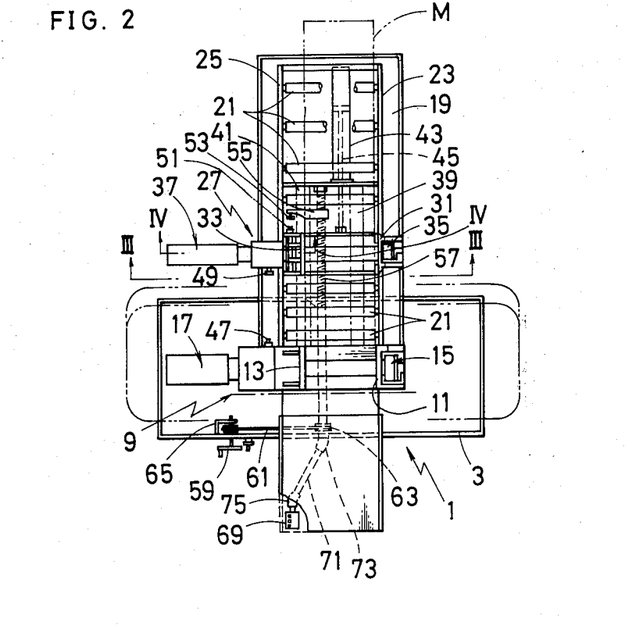
FIG. 2 is a plan view of the horizontal bandsaw machine shown in FIG. 1, with upper portions thereof being omitted for clarity.

As is best shown in FIGS. 1 and 2, a vise assembly 9 which is called a "front vise", has right-hand and left-hand vise jaws 11 and 13 mounted on the base 3 so as to hold or grip the material M to be cut therebetween at the cutting zone where the bandsaw blade 7 is lowered in cutting operations. The right-hand vise jaw 11 may be fixed on the front vise assembly 9 or preferably it may be so mounted as to be slightly movable toward and away from the left-hand vise jaw 13 by a hydraulic motor assembly 15 of a cylinder type according to the present invention as will be described in great detail hereinafter. Also, the left-hand vise jaw 13 is so mounted on the front vise assembly 9 as to be movable toward and away from the right-hand vise jaw 11 by a hydraulic motor assembly 17 of a cylinder type which may be of a well-known construction but may also be of a construction according to the present invention as will be described in great detail hereinafter. Thus, in order to hold the material M to be cut at the cutting zone during a cutting operation, the material M is initially placed between the right-hand and left-hand vise jaws 11 and 13 of the front vise assembly 9 and then the left-hand vise jaw 13 is urged toward the right-hand vise jaw 11 by the hydraulic motor assembly 17.

There is provided behind the base 3 an elongate rear base 19 which is so placed as to project rearwardly from the medial portion of the front base 3 at right angles therewith and is preferably fixed to the back of the front base 3. Also, a series of transverse rollers 21 are rotatably mounted on the rear base 19 so that the material M to be cut may be placed thereon and fed therefrom forwardly into the cutting zone. The rollers 21 are supported above the rear base 19 by a pair of parallel elongate bar members 23 and 25 which are so mounted as to horizontally extend between the front and rear ends of the rear base 19 along the length thereof in such a manner as to keep the rollers 21 raised up a distance from the top surface of the rear base 19 as is best shown in FIG. 3.

Figure 8:
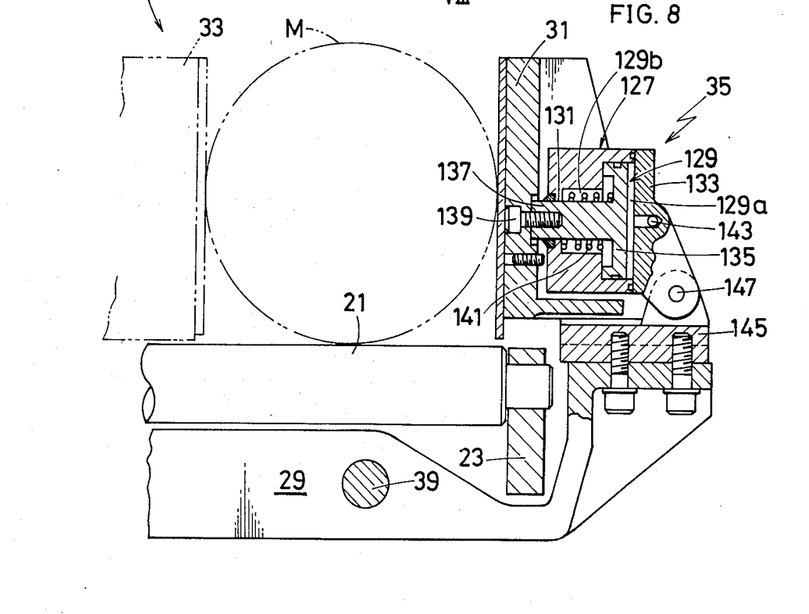
FIG. 8 is a partial sectional view showing a portion of the horizontal bandsaw machine shown in FIG. 1 and taken substantially along the line VIII—VIII of FIG. 7.

A rear vise assembly 27 which is conventionally referred to as a "feeding vise" or an "indexing vise" is movably mounted on the rear base 19 so that it can be moved thereon toward and away from the front vise assembly 9 to feed the material M to be cut into the cutting zone. The rear vise assembly 27 comprises a carriage 29 which is of a concave shape as shown in FIGS. 3 and 8 and which supports right-hand and left-hand vise jaws 31 and 33 to grip the material M therebetween. As is best shown in FIG. 3, the carriage 29 is so designed as to hold the right-hand and left-hand jaws 31 and 33 in opposed relationship at a raised position higher than the level of the tops of the rollers 21 on the rear base 19. The right-hand vise jaw 31 of the rear vise assembly 27 may be fixed on the carriage 29, or preferably it may be so arranged as to be slightly movable toward and away from the left-hand vise jaw 33 by a hydraulic motor assembly 35 of a cylinder type according to the present invention as will be described in great detail hereinafter. Also, the left-hand vise jaw 33 of the rear vise assembly 27 is so mounted on the carriage 29 as to be movable toward and away from the right-hand vise jaw 31 by a hydraulic motor assembly 37 of a cylinder type which will be described in greater detail hereinafter.

Thus, in order to feed the material M to be cut into the cutting zone, the material M is initially placed between the right-hand and left-hand vise jaws 31 and 33 of the rear vise assembly 27 on the rollers 21 on the rear base 19 and the left-hand vise jaw 33 is urged toward the right-hand vise jaw 31 by the hydraulic motor 37 and then the rear vise assembly 27 is moved frontward toward the front vise assembly 9.

Figure 3:
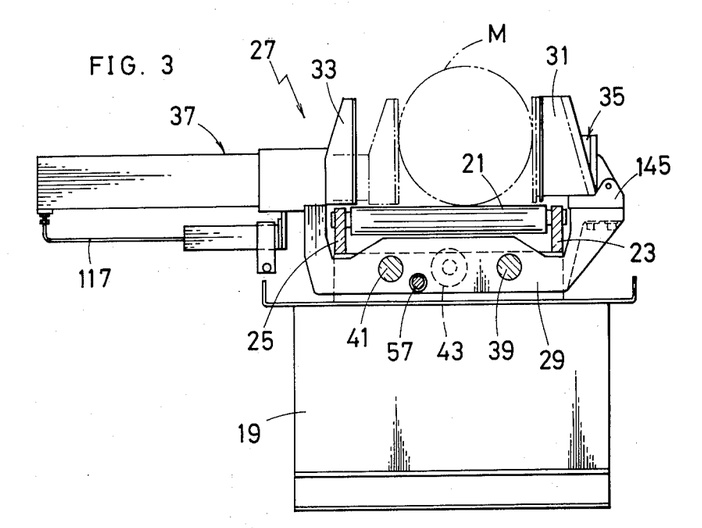
FIG. 3 is a front sectional view of the horizontal bandsaw machine shown in FIG. 1 taken along the line III—III of FIG. 2.

As best shown in FIGS. 2 and 3, the rear vise assembly 27 is so disposed as to be horizontally moved on the rear base 19 along a pair of guide members 39 and 41 by a hydraulic motor 43 having a piston rod 45. Movement of the rear vise assembly 27 occurs toward and away from the front vise assembly 9 in such a manner that the carriage 29 of the same will be moved beneath the rollers 21. The guide members 39 and 41 are horizontally mounted in parallel with each other in a suitable manner on the rear base 19 beneath the rollers 21 so that the carriage 29 of the rear vise assembly 27 may be moved therealong. Thus, in order to feed the material M to be cut into the cutting zone, the rear vise assembly 27 is made to grip the material M between the right-hand and left-hand vise jaws 31 and 33 and then is moved along the guide members 39 and 41 forwardly toward the front vise assembly 9 by the piston rod 45 of the hydraulic motor 43. As is apparent, when the material M to be cut is to be fed into the cutting zone, at least the left-hand vise jaw 13 of the front vise assembly 9 has been previously brought away from the right-hand vise jaw 11 of the same to enable the front vise assembly 9 to receive the material M. Also, after the material M has been fed into the cutting zone by the rear vise assembly 27, the front vise assembly 9 will grip the material M between the right-hand and left-hand vise jaws 11 and 13 and then the rear vise assembly 27 will release the material M prior to its being returned to its original position by the hydraulic motor 43.

As has been described hereinbefore and as is best shown in FIG. 3, the right-hand and left-hand vise jaws 31 and 33 of the rear vise assembly 27 are held by the carriage 29 of the same at the raised position higher than the level of the tops of the rollers 21 on the rear base 19, although the carriage 29 is movably mounted beneath the rollers 21. Thus, the left-hand vise jaw 33 of the rear vise assembly 27 can be moved toward the right-hand vise jaw 31 of the same over and across the rollers 21 on the rear base 19 to grip the material M to be cut in cooperation with the right-hand vise jaw 31. In this arrangement, the series of the rollers 21 are so provided as to range above the rear base 19 over to the front vise assembly 9 to cover the whole path where the material M to be cut is fed into the cutting zone.

From the above description, it will be now understood that the material M to be cut is supported in its entirety by the rollers 21 on the rear base 19 and is moved on the rollers 21 along the whole path when fed by the rear vise assembly 27 into the cutting zone. Thus, it will be understood that the material M can be smoothly fed into the cutting zone without significant friction between it and relatively fixed portions of the horizontal bandsaw machine 1. Thus, the material M can be accurately fed by the rear vise assembly 27 without being damaged by or imparting damage to relatively fixed portions of the bandsaw machine 1.

As best shown in FIG. 2, a switch means 47 such as a limit switch and a dog member 49 for actuating the switch means 47 are provided so as to stop the rear vise assembly 27 at its front travelling limit. In the preferred embodiment, the switch means 47 is fixed at the back portion of the front vise assembly 9, and the dog member 49 is fixed at the front portion of the rear vise assembly 27 so that it may be brought into contact with the switch means 47 when the rear vise assembly 27 reaches its front travelling limit. Thus, the switch means 47 is so arranged as to stop the hydraulic motor 43 from urging forwardly the rear vise assembly 27 when it is contacted by the dog member 49 when the rear vise assembly 27 has reached its front travelling limit.

As is also shown in FIG. 2, a switch means 51 and a dog member 53 for actuating the switch means 51 are provided so as to adjustably limit the rearward travel of the rear vise assembly 27. In the preferred embodiment, the switch means 51 is fixed at the back of the rear vise assembly 27, and the dog member 53 is supported by a movable carrier member 55 so as to be contacted by the switch means 51. Thus, the switch means 51 is so arranged as to stop the hydraulic motor 43 from urging rearwardly the rear vise assembly 27 when it has been brought into contact with the dog member 53. Also, the movable carrier member 55 carrying the dog member 53 is so arranged as to be horizontally moved frontwards and rearwards by a lead screw 57 which is horizontally and rotatably mounted on the front and rear bases 9 and 19 and is so disposed as to be rotated by a handwheel 59 through a suitable means such as a chain 61 and sprockets 63 and 65. Furthermore, the lead screw 57 may be connected with an indicator 69 by means of a shaft 71 and universal joints 73 and 75 so that it may be possible to see the position of the movable carrier member 55. Thus, the rearward travelling limit of the rear vise assembly 27 can be adjusted by rotating the lead screw 57 to adjust the position of the movable carrier member 55 carrying the dog member 53.

In this connection, it will be understood that the stroke length of the travel of the rear vise assembly 27 is determined by adjusting the rearward travelling limit of the same. As is readily apparent, the rear vise assembly 27 will feed the material M to be cut into the cutting zone by its stroke length in each feeding operation. Thus, the length of workpieces to be cut from the material M can be determined by adjusting the rearward travelling limit of the rear vise assembly 27. Also, the rear vise assembly 27 can be so set as to automatically feed the material M into the cutting zone by its stroke length to enable the bandsaw blade 7 to cut the material M into pieces of a length equal to its stroke length each time when the bandsaw blade has completed a cutting stroke.

Referring now to FIGS. 3 to 6 inclusive, the hydraulic motor assembly 37 for urging the left-hand vise jaw 33 of the rear vise assembly 27 is of a novel construction which is integrally connected to the left-hand vise jaw 33. As has been briefly described hereinbefore, the hydraulic motor assembly 17 for the left-hand vise jaw 13 of the front vise assembly 9 may be of a well-known construction, but it may be also the same construction as the hydraulic motor assembly 37 for the left-hand vise jaw 33 of the rear vise assembly 27.

Figure 4:
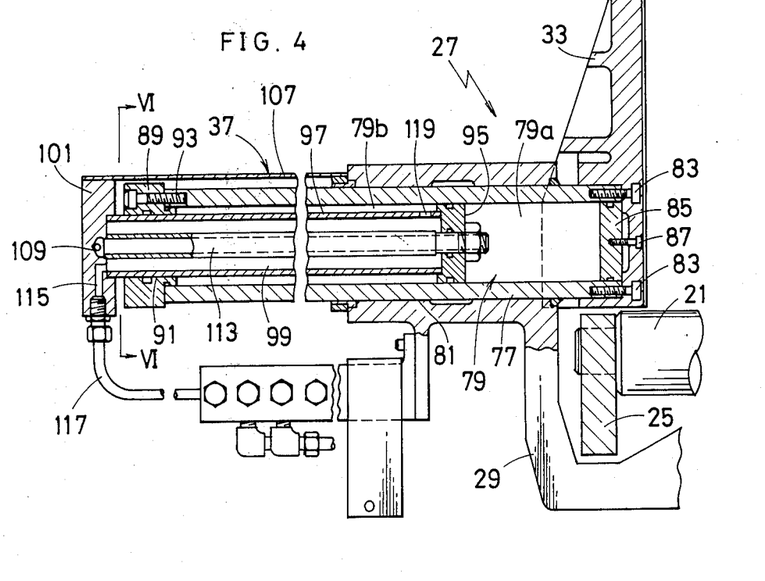
FIG. 4 is a front sectional view of the horizontal bandsaw machine shown in FIG. 1 taken substantially along the line IV—IV of FIG. 2.
Figure 5:
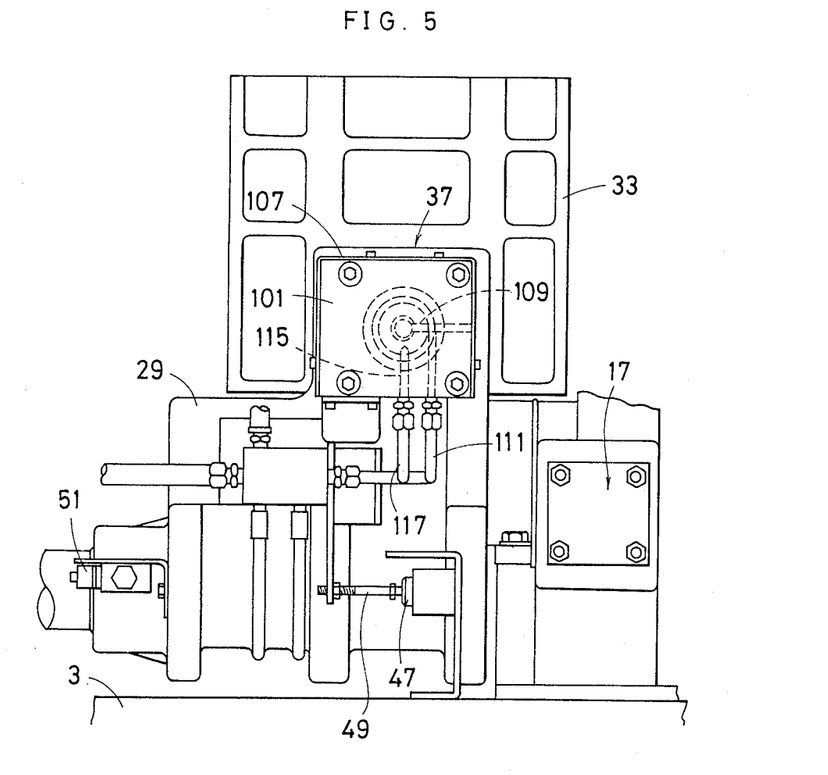
FIG. 5 is a side view showing a portion of the horizontal bandsaw machine shown in FIG. 1.
Figure 6:
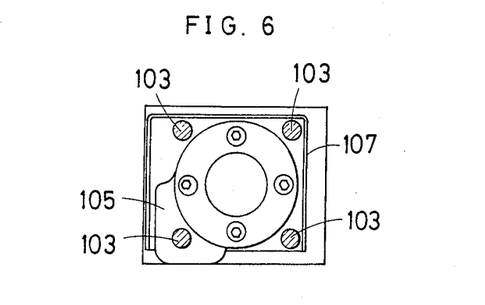
FIG. 6 is a sectional view showing a portion of the horizontal bandsaw machine shown in FIG. 1 and taken substantially along the line VI—VI of FIG. 4.

As best shown in FIG. 4, the hydraulic motor assembly 37 for moving the left-hand vise jaw 33 of the rear vise assembly 27 comprises an elongate cylinder 77 which has a chamber 79 and is horizontally slidably held by the carriage 29 in a cylindrical bore 81 horizontally formed at the projecting portion thereof. The cylinder 77 is integrally fixed to the left-hand vise jaw 33 by a suitable means such as a plurality of bolts 83 so as to move therewith toward and away from the right-hand vise jaw 31. The end of the cylinder 77 abutting the left-hand vise jaw 33 is closed by a cap member 85 which is also fixed to the left-hand vise jaw 33 by a suitable means such as a bolt 87, and the other end of the same is closed by a cap member 89 having a bore 91 and fixed thereto by a suitable means such as a plurality of bolts 93. Also, a piston 95 is slidably provided in the chamber 79 of the cylinder 77 to divide the chamber 79 into two sub chambers 79a and 79b, and it is fixed with a cylindrical piston rod 97 which has an elongated chamber 99 and slidably projects out of the cylinder 77 through the bore 91 of the cap member 89. The piston rod 97 is fixed at its projecting end to a supporting member 101 which is fixedly connected with the carriage 29 by a suitable tightening means such as a plurality of the rods 103 as shown in FIG. 6. Thus, the piston rod 97 is integrally fixed to the carriage 29 by means of the supporting member 101 and the tie rods 103, while the cylinder 77 is moved through the bore 81 on the carriage 29 to move the left-hand vise jaw 33 when either of the chambers 79a and 79b is supplied with the hydraulic fluid. In the preferred embodiment, the cylinder 77 is prevented from rotating in the cylindrical bore 81 of the carriage 29 by a projection 105 formed thereon and held by one of the tie rods 103 as seen from FIG. 6 and it is protected by a cover 107.

In order to supply and exhaust the hydraulic fluid into and from the subchamber 79a of the cylinder 77, a passage 109 to which a passage 111 is connected from the hydraulic source is formed at the supporting member 101, and a conduit 113 is provided in the chamber 99 of the piston rod 97 so as to connect the passage 109 and the chamber 79a throughout the piston 95. Also, another passage 115 is provided at the supporting member 101 to connect the chamber 99 of the piston rod 97 with a passage 117 leading to the hydraulic source and also a port 119 is formed to connect the chamber 99 of the piston rod 97 and the subchamber 79b of the cylinder 77 to supply and exhaust the hydraulic fluid into and from the subchamber 79b. Thus, the hydraulic fluid is supplied into and exhausted from the subchamber 79a of the cylinder 77 through the passage 109 and the conduit 113 and vice versa. On the other hand, the hydraulic fluid is supplied into and exhausted from the subchamber 79b of the cylinder 77 through the passage 115, the chamber 99 of the piston rod 97 and the port 119 and vice versa. Also, when the hydraulic fluid is being supplied into either of the subchambers 79a and 79b of the cylinder 77, it will be exhausted from the other of the subchambers 79a and 79b.

From the above description, it will be now apparent that the left-hand vise jaw 33 of the rear vise assembly 27 will be moved by the cylinder 77 of the hydraulic motor assembly 37 toward the right-hand vise jaw 31 to hold the material M to be cut in cooperation therewith when the chamber 79a of the cylinder 77 is supplied with the hydraulic fluid. Also, the left-hand vise jaw 33 will be moved by the cylinder 77 away from the right-hand vise jaw 31 to release the material M which it has gripped in cooperation with the right-hand vise jaw 31, when the chamber 79b of the cylinder 77 is supplied with the hydraulic fluid.

Figure 7:
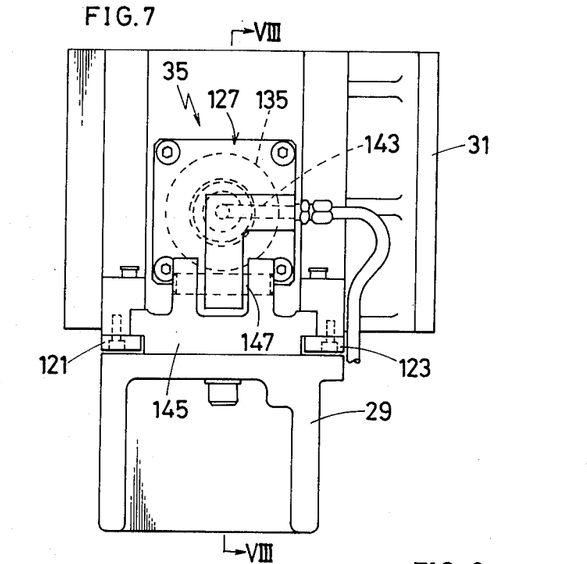
FIG. 7 is a side view showing a portion of the horizontal bandsaw machine shown in FIG. 1.
Figure 9:
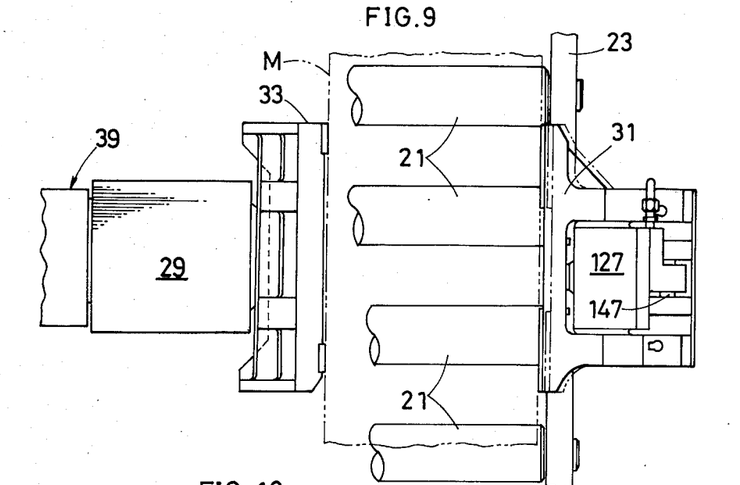
FIG. 9 is a partial plan view showing a portion of the horizontal bandsaw machine shown in FIG. 1.

Referring now to FIGS. 7 to 9 inclusive, the right-hand vise jaws 11 and 31 of the front and rear vise assemblies 9 and 27 may be so arranged as to be slightly movable toward and away from the left-hand vise jaws 13 and 33, respectively, by the hydraulic motor assemblies 15 and 35, respectively, as has been briefly described hereinbefore. Descriptions will be made with regard to the hydraulic motor assembly 35 for slightly moving the right-hand vise jaw 31 of the rear vise assembly 27, but both of the arrangements for the right-hand vise jaws 11 and 31 of the front and rear vise assemblies 9 and 27 are similar with each other.

As seen from FIG. 7, the right-hand vise jaw 31 of the rear vise assembly 27 is provided at its bottom with a pair of slide members 121 and 123 and is slidably mounted on the carriage 29 so as to be slightly moved by the hydraulic motor assembly 35 toward and away from the left-hand vise jaw 33. The hydraulic motor assembly 35 is constructed of a cylinder 127 having a chamber 129 which opens toward the left-hand vise jaw 33 through a bore 131 and is closed by a cap member 133 at its end opposite to the bore 131. A piston 135 having a piston rod 137 is slidably enclosed in the cylinder 127 to divide the chamber 129 into two subchambers 129a and 129b in such a manner that the piston rod will project out of the chamber 129 through the bore 131. The piston rod 137 is fixed to the right-hand vise jaw 31 by a suitable means such as a bolt 139, and the piston 135 and the piston rod 137 are biased by a spring 141 provided in the subchamber 129b in the direction away from the left-hand vise jaw 33. Also, the subchamber 129a of the cylinder 127 is provided with a port 143 from which the hydraulic fluid is supplied and exhausted to move the piston 135 and the piston rod 137. The hydraulic motor assembly 35 of the above described construction is connected to a supporting member 145 which is fixed onto the carriage 29. In the preferred embodiment, the hydraulic motor assembly 35 is connected to the supporting member 145 by means of a pin member 147 for the purpose of easy assembly, and the slide members 121 and 123 are kept from jumping up by the supporting member 145.

From the above description, it will be understood that the right-hand vise jaw 31 of the rear vise assembly 27 is moved toward the left-hand vise jaw 33 of the same by the piston 135 and the piston rod 137 when the subchamber 129a of the hydraulic motor assembly 35 is supplied with the hydraulic fluid. Also, it will be readily apparent that the right-hand vise jaw 31 is moved in the direction away from the left-hand vise jaw 33 by the force of the spring 141 when the piston 135 is not urged by the hydraulic fluid in the subchamber 129a of the cylinder 127.

In operation, the right-hand vise jaw 31 of the rear vise assembly 27 is slightly moved toward the left-hand vise jaw 33 of the same when the left-hand vise jaw 33 is moved to grip the material M to be cut, and it is returned to its original position when the left-hand vise jaw 33 is moved to release the material M. In other words, the right-hand and left-hand vise jaws 31 and 33 are moved toward each other to grip the material M in cooperation with each other, and they are moved away from each other to release the material M, although the left-hand vise jaw 33 is moved by a much longer stroke than the right-hand vise jaw 31 according to the sizes of the material M to be cut.

The rear vise assembly 27 of the above described arrangement is operated in connection with the front vise assembly 9 which is arranged in all the same manner as the front vise assembly 9. When the rear vise assembly 27 is feeding the material M to be cut into the cutting zone, both of the right-hand and left-hand vise jaws 11 and 13 of the front vise assembly 9 are moved away from each other to receive the material M therebetween. Thus, the material M will be by no means brought into contact and into collision with the right-hand vise jaw 11 of the front vise assembly 9 when fed into the cutting zone, since the right-hand vise jaw 11 has been slightly moved off the path of the material M. Also, when the rear vise assembly 27 is returning into its original position after the material M has been held by the front vise assembly 9, both of the right-hand and left-hand vise jaws 11 and 13 are kept moved away from each other so that they may go back to the original position without contacting the material M held by the front vise assembly 9.

Figure 10:
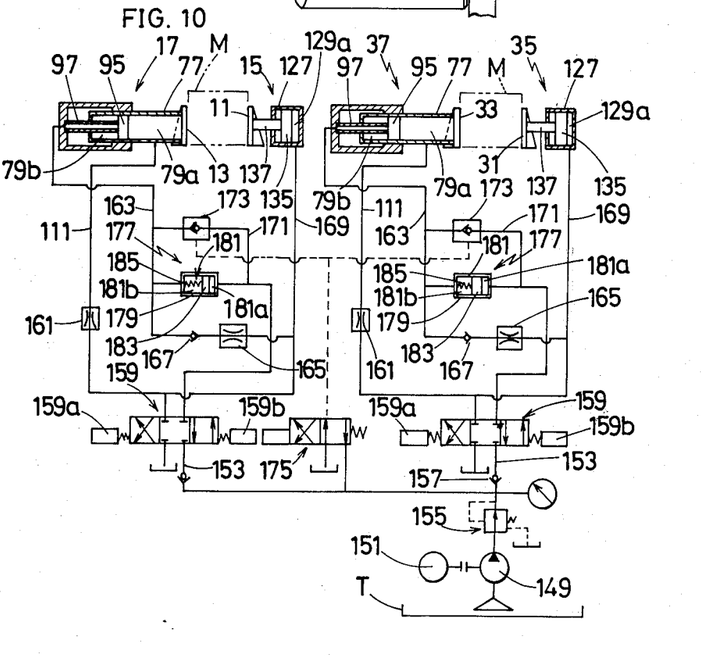
FIG. 10 is a schematic illustration of the horizontal bandsaw machine shown in FIG. 1.

Referring to FIG. 10, descriptions will be made with regard to hydraulic circuits for actuating the front and rear vise assemblies 9 and 27. Since the hydraulic circuit for the front vise assembly 9 and that for the rear vise assembly 27 are essentially identical, descriptions will be made mainly with regard to the hydraulic circuit for the rear vise assembly 27 and elements common to both of the circuits will be designated by common numerals.

The hydraulic motors 35 and 37 for actuating the right-hand and left-hand vise jaws 31 and 33 of the rear vise assembly 27 are supplied with the hydraulic fluid from a hydraulic tank T by a pump 149 driven by a motor 151. The pump 149 is connected by a passage 153 having a relief valve 155 and a check valve 157 to a solenoid operated valve assembly 159 which is of a three position type having four parts and is operated by solenoids 159a and 159b. The solenoid operated valve assembly 159 is connected by the passage 111 having a flow control valve 161 to the chamber 79a of the hydraulic motor 37 for the left-hand vise jaw 33 and by a passage 163 having a flow control valve 165 and a check valve 167 to the chamber 79b of the same, and also it is connected by a passage 169 to the chamber 129a of the hydraulic motor 35 for the right-hand vise jaw 31. The solenoid operated valve assembly 159 is so arranged that it will supply the hydraulic fluid into the chambers 79a and 129a of the hydraulic motors 37 and 35 and exhaust the same from the chamber 79b of the hydraulic motor 37 when the solenoid 159a is energized while it will supply the hydraulic fluid into the chamber 79b and exhaust the same from the chambers 79a and 129a when the solenoid 159b is energized. There is provided a bypass passage 171 which has a pilot operated check valve 173 and connects between the solenoid operated valve assembly 159 and the passage 163. The pilot operated valve 173 is so arranged as to normally block the hydraulic fluid from flowing from the solenoid operated valve assembly 159 to the passage 163 but allow the hydraulic fluid to flow therethrough when a solenoid operated valve assembly 175 is operated in the preferred embodiment.

A control means 177 is provided between the passage 163 and the passage 171 so as to control the stroke length by which the left-hand vise jaw 33 is moved in the direction away from the right-hand vise jaw 31. The control means 177 comprises a cylinder 179 having a chamber 181, a piston 183 slidably enclosed in the cylinder 179 and dividing the chamber 181 into two chambers 181a and 181b connected with the bypass passage 171 and the passage 163, respectively, and also a spring 185 biasing the piston 183 in the chamber 181b.

In the above arrangement, when the solenoid 159a of the solenoid operated valve assembly 159 is energized, the hydraulic fluid will be delivered into the chambers 129a and 79a of the hydraulic motor assemblies 35 and 37 of the rear vise assembly 27 and the hydraulic fluid in the chamber 79b is exhausted to the hydraulic tank T. As a result, the cylinder 77 and the piston 135 of the hydraulic motor assemblies 37 and 35 will move the right-hand and left-hand vise jaws 33 and 31, respectively, toward each other to grip the material M to be cut therebetween.

When the solenoid 159b of the solenoid operated valve assembly 159 is energized, the chambers 79a and 129a of the hydraulic motor assemblies 37 and 35 will be connected to hydraulic tank T and simultaneously the hydraulic fluid from the pump 149 will act on the piston 183 in the chamber 181 of the control means 177. As a result, the hydraulic fluid in the chamber 181b of the control means 177 will be urged by the piston 183 to act on the cylinder 77 of the hydraulic motor assembly 37 so as to move the left-hand vise jaw 33 slightly in the direction away from right-hand jaw 31. Of course, the right-hand vise jaw 31 is moved away from the left-hand vise jaw 33 by the spring 141 of the hydraulic motor 35, as soon as the solenoid 159b of the solenoid operated valve assembly 159 is energized to connect the chamber 129a of the hydraulic motor assembly 35 to the hydraulic tank T. Thus, it will be readily understood from the above description that the left-hand vise jaw 33 is very slightly moved to ease the material M and grip again the same with a result that idle time is eliminated.

When it is desired to move the left-hand vise jaw 33 by a larger distance in the direction away from the right-hand vise jaw 31 to grip a larger material M, the solenoid operated valve assembly 175 is operated to allow the hydraulic fluid to flow through the pilot operated valve 173 from the pump 149 into the passage 163 and the solenoid 159b of the solenoid operated valve assembly 159 is energized. As a result, the hydraulic fluid from the pump 149 is delivered into the chamber 79b of the hydraulic motor assembly 37 to move the left-hand vise jaw 33 in the direction away from the right-hand vise jaw 31 by a larger distance. Thereafter, the left-hand vise jaw 33 is moved toward the right-hand vise jaw 31 to grip the larger material M in cooperation with the right-hand vise jaw 31 and it will be slightly moved to release the material M after cutting operation.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A cutting machine for subdividing material lengths, comprising:
    a roller table for supporting the material for movement along a transport path to a cutting zone;
    a cutting head assembly having a cutting blade for cutting material located at said cutting zone;
    a front vise assembly fixed adjacent to the cutting zone, said front vise assembly having first and second jaws arranged in opposed mutually spaced relationship on opposite sides of said transport path, with first jaw operating means for adjusting the spacing of said first and second jaws between an open position permitting movement therebetween of said material and a closed position clamping said material therebetween;
    a carriage underlying said roller table, said carriage being configured for movement independently of said roller table and any material length supported thereon in opposite directions parallel to said transport path,
    a rear vise assembly mounted on said carriage for movement therewith, said rear vise assembly having third and fourth jaws arranged in opposed mutually spaced relationship on opposite sides of said transport path, with second jaw operating means carried on said carriage for adjusting the spacing of said third and fourth jaws between an open position permitting the aforesaid movement of said carriage relative to said material and a closed position clamping said material therebetween and establishing a fixed relationship between said material and said carriage; and,
    carriage operating means for moving said carriage in opposite direction along said transport path.

2. The cutting machine of claim 1 wherein said first and second jaw operating means each comprise hydraulically actuated mechanisms for shifting said first and third jaws respectively towards and away from said second and fourth jaws.

3. The cutting machine of claim 2 wherein said hydraulically actuated mechanisms comprise piston-cylinder units.

4. The cutting machine of claim 2 wherein said first jaw operating means further comprises resilient means for biasing said second jaw away from said first jaw to a retracted position laterally spaced from material being conveyed along said transport path, and hydraulically actuated means acting in opposition to said resilient means to force said second jaw towards said first jaw and into an operative position engaging said material.

5. The cutting machine of claim 2 wherein said second jaw operating means further comprises resilient means for biasing said fourth jaw away from said third jaw to be retracted position laterally spaced from material being conveyed along said transport path, and hydraulically actuated means acting in opposition to said resilient means to force said fourth jaw towards said third jaw and into an operative position engaging said material.

6. The cutting machine of claim 2 wherein said carriage operating means comprises a hydraulically actuated piston-cylinder unit underlying said roller table and extending in a direction parallel to said conveyor path between said carriage and a fixed frame.

7. The cutting machine of claim 1 further comprising control means operating in conjunction with said carriage operating means to limit the extent of movement of said carriage towards and away from said cutting zone.

8. The cutting machine of claim 7 wherein said control means includes switch means on said carriage positioned to engage dog means positioned along said transport path, the position of one of said dog means being adjustable relative to said cutting zone in order to vary the feed stroke of the machine.

* * * * *